United States Patent [19]
Ford

[11] Patent Number: 4,504,353
[45] Date of Patent: Mar. 12, 1985

[54] APPARATUS AND METHOD FOR SEALING AND CUTTING THERMOPLASTIC STRAPS

[75] Inventor: Graham Ford, Cambridge, England

[73] Assignee: Gerrard Industries Limited, South Yorkshire, England

[21] Appl. No.: 574,204

[22] Filed: Jan. 27, 1984

Related U.S. Application Data

[63] Continuation of Ser. No. 401,603, Jul. 26, 1982, abandoned.

[30] Foreign Application Priority Data

Aug. 5, 1981 [GB] United Kingdom ............... 8123902
May 24, 1982 [GB] United Kingdom ............... 3215054

[51] Int. Cl.³ ............................................. B32B 31/00
[52] U.S. Cl. ................................. 156/499; 53/399; 53/582; 100/2; 100/33 PB; 156/157; 156/217; 156/268; 156/308.4; 156/309.9; 156/468; 156/502; 156/510; 219/243
[58] Field of Search ............ 156/157, 217, 268, 308.4, 156/468, 309.9, 499, 510, 502; 219/243; 53/399, 582; 100/2, 33 PB

[56] References Cited

U.S. PATENT DOCUMENTS

| 3,168,617 | 2/1965 | Richter | 174/68.5 |
| 3,368,323 | 2/1968 | Wood | 156/157 |
| 3,397,105 | 8/1968 | Takami | 100/33 PB |
| 3,948,720 | 4/1976 | Reil | 156/498 |
| 4,288,270 | 9/1981 | Mossell et al. | 156/499 |

Primary Examiner—John J. Gallagher
Attorney, Agent, or Firm—Oblon, Fisher, Spivak, McClelland & Maier

[57] ABSTRACT

An apparatus for heat sealing together layers of strap of thermoplastics material, wherein at least one thin flat electrical heating element is supported under tension and between the layers of strap and the layers of strap are pressed together with a fusing pressure by at least one resilient pressure pad. The heating element, a support for the heating element and the resilient pressure pad form a heating and fusing assembly which is moved in unison relative to the layers of strap so that in use, the heating element moves between the two layers of strap generally in a longitudinal direction thereof.

26 Claims, 9 Drawing Figures

APPARATUS AND METHOD FOR SEALING AND CUTTING THERMOPLASTIC STRAPS

This application is a continuation of application Ser. No. 401,603, filed July 26, 1982, now abandoned.

DESCRIPTION

1. Field of Invention

This invention relates to a method and apparatus for heat sealing together layers of strap of thermoplastics material such as polyester and polypropylene.

2. Background of the Invention

In the packaging industry, it is a common requirement to tension and secure a thermoplastics strap around the periphery of a package. In order to secure the tensioned loop, two layers of strap must be fixed together where they overlap at the common beginning and end of the loop.

Mechanical fastenings such as metal clips crimped around the two strap layers or deformable wire buckles locking to the two strap layers produce a structurally inefficient joint and are expensive to produce and handle.

Friction welding, wherein a flat or cylindrical pad is oscillated parallel to the plane of contact of the two strap layers in pressure contact therewith can also result in a structurally inefficient joint for some types of strap, especially a strap of polyester and, in addition, an uncomfortable amount of noise is generated. Furthermore, the high power required necessitates use of a compressed air or mains electric drive.

Ultra-sonic welding is equally disadvantageous, being less successful for some types of strap than others, and requiring relatively complex circuitry for providing the necessary operating power.

A known heat sealing process also demands use of a high power source external to the sealing equipment. In this process, a continuously or intermittently heated, relatively massive, heating element is caused to enter between the two layers of strap by moving said element across the strap from one longitudinal edge to the other. The two strap layers are first pressed against the heating element and then, after a short delay, the element is rapidly retracted and the two strap layers are pressed together at the heated regions thereof. This process, in adddition to disadvantageously requiring an external power source, produces considerable unpleasant fumes, since the operating temperature rises to a value necessarily higher than the decomposition temperature of the strap material.

It is an object of this invention to provide an improved method and apparatus for heat sealing together two layers of thermoplastics strap.

It is another object of this invention to provide an improved apparatus for heat sealing together two layers of thermoplastics strap, in particular an apparatus which can be made fully portable, i.e. having an internal power source, and which is capable of operation substantially without generation of noise and fumes, whilst at the same time producing a structurally efficient joint.

After the strap, e.g. drawn from a supply reel, has been looped around a package and the loop tensioned and secured by heat sealing two strap layers together, it is necessary to cut one strap layer, e.g. that extending from the supply reel, without severing the other and it is a further object of the present invention to provide an apparatus for effecting this final stop of the packaging process.

SUMMARY OF THE INVENTION

According to the invention there is provided a method of heat sealing together layers of strap of thermoplastics material, according to which a thin electrical heating element is moved with a forward and reverse motion between two layers of strap substantially in the longitudinal direction of said strap.

According to a preferred feature of the invention the heating element is supplied with heating current only in one sense of the forward and reverse motion.

Preferably the two layers of strap are pressed together with a fusing pressure, with the moving heating element supplied with heating current sandwiched between them, over the region of the strap at which the two layers are to be heat sealed together.

Preferably the fusing pressure is maintained over said heated strap region after withdrawal of the heating element from said region until fusion between the two layers has occurred.

The speed of motion of the heating element, when supplied with heating current, is controlled so as to effect melting of the thermoplastics layers of strap without decomposition thereof.

Preferably the heating element is maintained under tension, even when hot.

The invention also lies in a method of securing a thermoplastics strap around a package in which the ends of thermoplastics strap are heat sealed together in accordance with the method of the invention after the strap has been tensioned around the package.

According to a preferred feature of the invention a method of fusing two layers of thermoplastics material comprising the steps of:

(1) effecting relative movement between a heating element sub-assembly carrying one or more heating elements, and the two material layers, in a first direction from a home position towards a maximum displacement position.

(2) in advance of the attainment of the maximum displacement position, causing an electric current to flow through the element or elements, so that the latter achieves a fusing temperature at the maximum displacement position, and (3) causing the sub-assembly to change direction and return from the position of maximum displacement towards the home position, and (4) maintaining the flow of current and fusing temperature during the return movement, to effect a fusing of the two layers.

The method may further comprise the step of switching off the current and allowing the element or elements to cool in advance of the attainment of the home position, to inhibit fusing during the last part of the return movement.

The method may comprise the steps of:

(1) initiating movement of the sub-assembly from the home position for length of time sufficient to allow the fused bond to become secure, (2) causing the sub-assembly to move in a forward direction whilst the current remains OFF into an intermediate position at which a member lies below a knife edge, the said member occupying a position between the two layers, and (3) effecting a movement of the knife edge so as to engage and sever the layer of material between the knife edge and the said member.

The method may further comprise the step of heating the knife edge electrically whilst the sub-assembly moves towards the intermediate position.

The method may also involve after severence, removing the heating current from the knife edge to allow the latter to cool and causing the knife edge to return to its normal position away from the layers of fused material and moving the sub-assembly in the return direction to its home position once again.

According to another aspect of the invention, there is provided an apparatus for heat sealing together layers of strap of thermoplastics material, comprising a thin flat electrical heating element, means supporting said heating element under tension, and means for moving said supporting means so that in use the heating element moves between two layers of strap generally in the longitudinal direction thereof.

Being thin, the heating element can have low thermal mass and may be supplied with heating current from a secondary cell source, e.g. source employing lead acid or nickel-cadmium cells, preferably sealed and rechargeable. The apparatus can thus be of portable nature, e.g. the equipment can take the form of a hand tool. Alternatively, heating current may be derived from an external (mains) power supply through a low voltage transformer.

In a preferred embodiment of the invention the heating apparatus comprises two or more thin, flat, elongated electrical heating elements, means supporting said two or more heating elements under tension in generally parallel relationship, and means for moving said supporting means so that in use all the said two or more heating elements are moved transversely to their lengths between the two layers of strap generally in the longitudinal direction thereof.

According to another aspect of the present invention, there is provided a heating element assembly for use in a heat sealing apparatus for thermoplastics materials, comprising a support, a plurality (generally two) of thin, flat, elongated electrical heating elements mounted to said support by connecting means at the ends of each such element, and at least one connecting means for each such heating element comprising a tensioning element for maintaining the corresponding heating element under tension even when hot.

Electrical contact elements, fixed to or integrally formed with each of the above-described tensioning elements, may project laterally to opposite sides of the heating assembly to enable power connections to be made to the respective heating elements without interference.

Conveniently, each heating element is tensioned by stretching between a support and tensioning element.

The tensioning element may be an elongate element extending in line with a heating element.

In one embodiment the tensioning element is resiliently formed by concertina-type folds transverse to its length.

Alternatively a U-shaped spring may be used to tension each element.

In a preferred embodiment of the invention a heating element assembly for use in heat sealing apparatus for thermoplastics materials, comprises a support, a thin flat electrical heating element carried by the support, and connecting means between the support and the heating element at both ends of the latter, at least one of such connecting means being constituted by a tensioning element in the form of a spring having a foot connected to the heating element, an intermediate U-portion the limbs of which can flex towards and apart from one another in line with or parallel to the length of the heating element, and an end portion whereat the spring is anchored to effect tensioning of the heating element.

While a tensioning element as described is possible at both ends of the heating element, it is preferred that the connecting means at the other end of the heating element be a direct connection such as a weld effected under a weld pad. Heating current may then be supplied to the heating element through the above-described spring, the foot of which is electrically insulated from the support, as by means of an insulating pad.

In a preferred construction, the foot is elongated in the direction of the length of the heating element, with one limb of the U-portion at the remote rear end of said foot, the other limb of the U-portion being shorter and nearer the heating element, and the end portion projecting from the lower end of said other limb, preferably forwardly. A laterally extending contact element can then be fixed to said end portion, said contact element having an end piece extending back parallel to and away from the heating element, thereby to facilitate fixing thereof to a carriage on which the support is mounted and by means of which the complete heating assembly can be moved between two layers of thermoplastics strap to be heat sealed together. The contact element may be formed as an integral part of the spring tensioning element if desired.

Conveniently, the width of the heating element is at most about one half its unsupported length between the support and the tensioning element. The unsupported length of the heating element generally corresponds to the width of strap to be heat sealed, since in use it is proposed to move the heating element, transversely of its length, longitudinally along between two layers of strap to be heat sealed together, as described herein.

In a preferred arrangement, the support is made of cold rolled stainless steel, the spring is made of Berylium-copper alloy and the heating element is made of a high electrical resistivity, high temperature strength alloy, such as Inconel. In this preferred arrangement, the support is a thin, flat, short limbed U-support and the heating element is secured at one end to one short limb to extend generally parallel to a long crosspiece of the support to the tensioning element, which is slidingly support but insulated from the other short limb.

According to another aspect of the invention each heating element forms part of a movable heating assembly wherein each heating element is a flat element of low thermal mass between about 0.05 mm and 0.20 mm thick with a width about one half its unsupported length between the support and the tensioning element, i.e. one half the width of the strap with which the heating element is designed to co-operate.

In a preferred method of use the heating element is moved first in one direction and then in the opposite sense substantially in the longitudinal direction of the strap. In apparatus for performing this method switching means is provided for supplying heating current to the heating element only during one sense of the forward and reverse motion, and the fusing pressure is applied only during this sense of the motion.

It is a problem with an arrangement such as described that durable electrical connections must be established to the heating element or heating elements from a stationary power control circuit, since it is obviously desirable that the power source, e.g. a battery in the case of a portable tool, and the control circuitry including switches, should not be mounted on the oscillatable carriage which carries the heating element assembly.

Flying leads have the disadvantage that fatigue may set in prematurely, and present practical problems in enabling a relatively large oscillation for the contemplated size of tool. The thin cabling which would be desirable to allow movement thereof without undue mechanical resistance as the oscillations take place introduces substantial electrical resistance.

According to a further feature of the present invention, there is provided apparatus for heat sealing thermoplastics materials and incorporating at least one electrical heating element which is reciprocable in use, wherein a pair of substantially rigid electrical connectors carry contacts making sliding electrical engagement with a corresponding pair of electrical rails carried by a structure relative to which the heating element is reciprocable, the rails extending parallel to the direction of reciprocation and being adapted for supply of electrical power thereto in order to transmit heating current to and from the one or more heating elements through said connectors and contacts.

It is another object of the invention to provide means for pressing the two layers of thermoplastics strap together under a fusing pressure, and according to another aspect of the present invention, there is provided apparatus for heat sealing together layers of strap of thermoplastics material, comprising a thin, flat, electrical heating element movable between two strap layers, and a pressure pad for pressing the strap layers together under a fusing pressure in the heated regions of said layers, said pad being mounted for rocking about an axis perpendicular to the length direction of the strap layers and being resiliently deformable so as to be capable of bowing about the rocking axis to accommodate the movement of the heating element between the two layers of fusible material.

Preferably, a separator plate is provided between the two layers of fusible material to separate the strap layers prior to heating.

In a preferred arrangement layers of material are sandwiched between a first pressure pad which is constituted by a fixed first platen, and the rockable pressure pad is supported by a second platen, the latter being movable as by pivoting away from the first platen to enable the fusing pressure to be applied and to be relieved.

In this last mentioned arrangement, the heating element (which may be a multiple element) rockable pressure pad and separator plate when provided, form part of a heating and fusing assembly which is reciprocable along the length of the strap layers, with heating current supplied only during one sense of the reciprocating motion, as previously proposed.

The pressure pads are preferably of non-compressible material; in particular the rockable pressure pad and the separator plate may conveniently be made of cold rolled stainless steel.

As so far described the invention provides a solution to many of the problems associated with the use of thermoplastics straps for packaging purposes. There is, however, a final step in the packaging process not yet dealt with.

When the strap, e.g. drawn from a supply reel, has been looped around the package and the loop tensioned and secured by heat sealing two strap layers together, it is necessary to cut one strap layer, e.g. that extending from the supply reel, without severing the other.

According to this aspect of the invention, there is provided an apparatus for heat sealing together layers of strap of thermoplastics material, comprising a heating and fusing means whereat the two strap layers are brought into adjacent relationship, heated at regions of their opposed facing surfaces to effect melting thereof and the melted surface regions are pressed together to effect fusing of the strap layers, said heating and fusing means including at least one solid element which extends between the two strap layers, and a cutting means for severing one strap layer and not the other after fusing the strap layers together, said cutting means including a knife edge which is operable on one of said layers against the backing afforded by said solid element.

The knife edge most preferably forms part of a heated knife, whereby the mechanical effort needed for cutting is minimised.

The said solid element can be a heating element, such as a thin, flat, heating element or one of such elements as described herein, or it can for example be the aforementioned separator.

In the drawings:

FIG. 1 diagrammatically shows a preferred heating element assembly in perspective view, FIG. 2 diagrammatically illustrates a preferred method of heat sealing a thermoplastics strap using the heating element assembly of FIG. 1, FIG. 3 shows a simple power circuit for supplying heating current to the heating element, FIG. 4 diagrammatically shows another heating element assembly in perspective view, FIG. 5 diagrammatically shows another embodiment of heating element assembly in perspective view, FIG. 6 shows a further embodiment of heating element assembly, FIG. 7 shows in diagrammatic form a means for supplying electrical power to the heating element assembly, FIG. 8 diagrammatically illustrates one form of apparatus for heat sealing a thermoplastics strap using a heating and fusing assembly incorporating the subassembly of FIG. 5 which incorporates a cutter, and FIG. 9 is a plan view to an enlarged scale of the cutter shown in FIG. 8.

DETAILED DESCRIPTION OF ILLUSTRATED EMBODIMENTS

Figure 1:
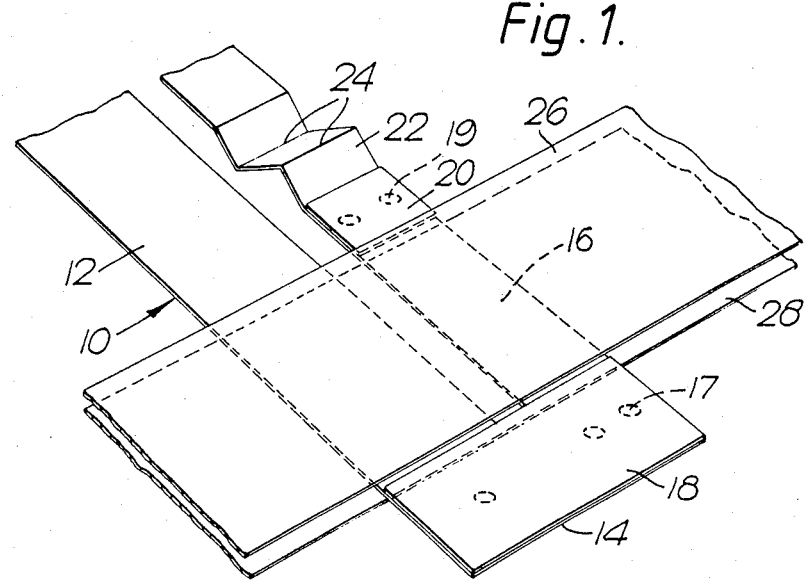

The heating assembly in FIG. 1 comprises a somewhat resilient, flat, L-shaped support 10, conveniently of stainless steel, with a long leg 12 and short leg 14. One end of a thin, flat, heating element 16, made of high resistivity, high temperature alloy such as Inconel, is spot welded, as indicated at 17, to the short leg 14 under a weld pad 18. The other end of the heating element 16 is spot welded, as indicated at 19, under a weld pad 20, to a tensioning element 22. The tensioning element 22, conveniently of stainless steel, is resiliently formed by means of concertina-type folds 24 transverse to its length. The assembly thus forms a U-shape, with the heating element 16 tensioned parallel to the long leg 12 of the L-support 10.

The complete heating element assembly is mounted to a carriage (not shown) disposed to the side of two layers 26,28 of thermoplastics strap to be heat sealed together, so that the U-shaped assembly, and in particular the heating element 16 (and corresponding part of the long leg 12 of the L-support) can be moved transverse to its length, between the two strap layers, in the longitudinal direction of the strap.

Figure 2:
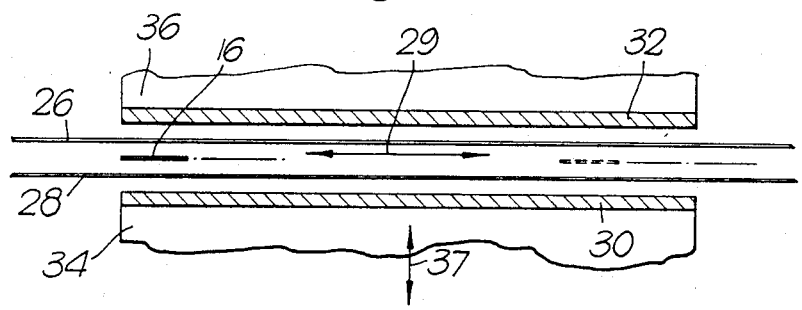

The preferred heating element 16 of Inconel is conveniently between 0.05 mm and 0.20 mm thick, with a width of about one half its unsupported length between the L-support 10 and the tensioning element 22, the latter corresponding to the width of the strap which the heating element is designed to seal. As compared with conventional heating elements for heat sealing, the element 16 thus possesses a very low thermal mass. In FIGS. 1 and 2, the electrical leads to the element 16 are omitted.

While the heating element 16 supplied with heating current is moving between the strap layers 26, 28 more particularly by moving the supporting carriage with a forward and reverse motion parallel to the length of the strap, as indicated by arrow 29 in FIG. 2, the two strap layers are urged together under a fusing pressure. This fusing pressure is exerted by two resilient pads 30, 32 (see FIG. 2), backed by respective rigid supports 34, 36. At least one support, the support 36 for instance and the resilient pad 30 carried thereby, is movable towards the other, as indicated by arrow 37, to enable the fusing pressure to be applied and relieved, as appropriate. Each pad 30, 32 is otherwise stationary, being wide enough to cover the full width of the strap and long enough to cover the entire stroke of reciprocation of the heating element, i.e. to cover the entire heated area of the two layers of strap.

The two layers of strap 26, 28 are thus urged together, with the moving heating element 16 sandwiched therebetween, with a substantially uniform pressure over the entire heated area. Foam rubber is a convenient material for the pads 30,32.

Figure 3:
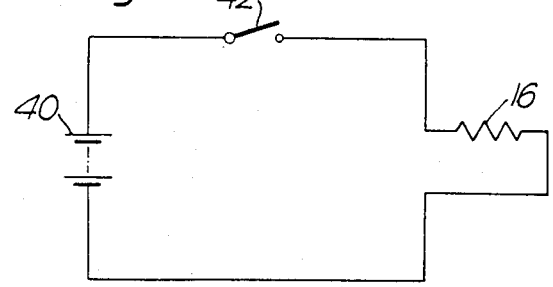

As indicated in FIG. 3, heating current for the heating element 16 is obtained from a source 40 of secondary cells, e.g. rechargeable sealed nickel-cadmium cells, supplied through a switch 42 operable by suitable means (not shown) to open and close in synchronism with the reversals of the forward and reverse motion of the heating element assembly. Thus, the heating element 16 is supplied with current, at least 20 amps from a 1 to 3, e.g. 2.5, voltage source, only during the reverse stroke of the forward and reverse motion. During such reverse stroke, the speed of movement of the heating element is carefully controlled, taking into account the materials involved, so that no part of the heating element assembly is heated as high as the decomposition temperature of the strap material. This is facilitated by use of the thin flat heating element of low thermal mass, the entire heating area of which is sandwiched between the two strap layers under the fusing pressure, so that heat is extracted from the heating element assembly at a rate which maintains the heated regions of the strap layers at a temperature only a little above the melting point of the thermoplastics material concerned.

Preferably, the fusing pressure is applied only during the reverse stroke of the forward and reverse motion of the heating element, while heating is taking place. For this purpose, the pad 30 may be automatically moved to the fusing pressure position at the beginning of a reverse stroke.

At the end of the reverse stroke of the heating element, the heating element assembly is retracted from the heated region of the strap whilst the fusing pressure is maintained until the melted thermoplastics material has resolidified, fusing the two strap layers together. Simultaneously, of course, the heating current is cut off, thereby to ensure that the element does not overheat.

A seal about 30 mm long (along the length of the strap) can be effected in about one second. Such a seal in a typical case will have strength of at least 60 percent of the parent material. However, means will be provided to adjust the length of seal i.e. the length of the strokes of the forward and reverse movement of the heating element, since some variation of the length of seal will be required in accordance with differing widths of strap.

The above description assumes that a seal can be completed with a single cycle of reciprocation (forward and reverse motion) of motion of the heating element assembly. However, although unlikely to be required, preliminary heating strokes to initiate softening of a thermoplastics material of relatively high melting point can be carried out. In this case, the fusing pressure will be applied only during the final reverse stroke.

Figure 4:
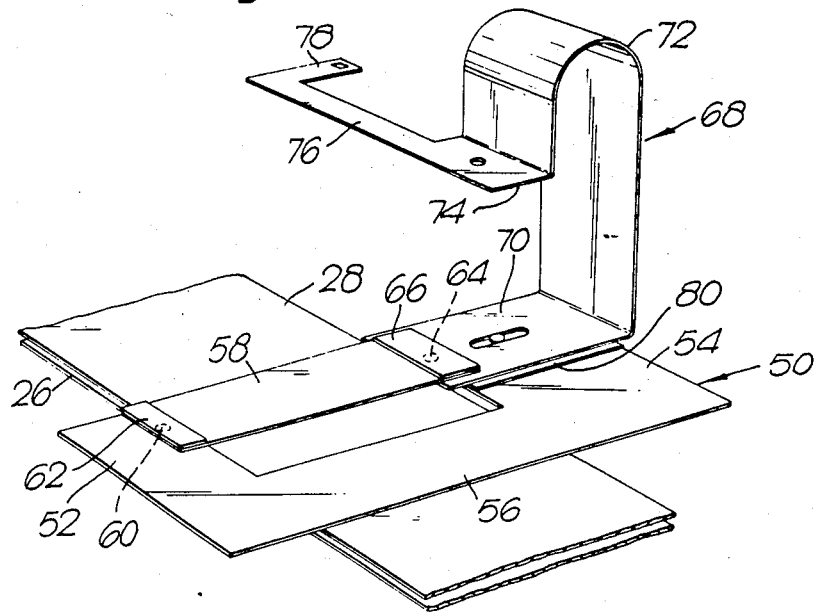

The heating element assembly of FIG. 4 comprises a somewhat resilient, flat, U-shaped support 50, conveniently of cold rolled, stainless steel, with short limbs 52 and 54 connected by a longer crosspiece 56. One end of a thin, flat, heating element 58, (corresponding to item 16 in FIG. 1) and made of high resistivity, high temperature alloy such as Inconel, is spot welded, as indicated at 60, to the limb 52 under a weld pad 62. The other end of the heating element 58 is spot welded, as indicated at 64, under a weld pad 66, to a tensioning element 68. The tensioning element 68, conveniently of Berylium-copper alloy is formed with a foot 70, to which the heating element 58 is welded at 64, which foot is elongated rearwardly away from the heating element. Upstanding from the foot 70 the tensioning element 68 has an intermediate U-portion 72, the limbs of which can flex towards and away from one another generally in line with the length of the heating element 58, and a forwardly extending end portion 74 which is fixed as by welding to a relatively rigid, electrical contact element 76 of L-shape. The contact element 76 extends generally laterally, with a piece 78 at its most lateral end extending rearwardly to enable anchorage thereof in a manner which tensions the heating element 58. In use, current for the heating element 58 is supplied through this contact element 76 and the spring tensioning element 68. The foot 70 of the tensioning element 68 is therefore electrically insulated, as by an insulating pad 80 over which it can slide, from the limb 54 of the support 50. In use, when the thin heating element 58 expands due to heating thereof, the tensioning element is able to flex to maintain the tension in said heating element which is essential to avoid risk of buckling.

The complete heating element assembly shown in FIG. 4 is mounted to a carriage (not shown) disposed to the side of two layers 26, 28 of thermoplastics strap to be heat sealed together, so that the U-shaped assembly, and in particular the heating element 58 (and corresponding part of the long crosspiece 56 of the U-support 50) can be moved transverse to its length, between the two strap layers, in the longitudinal direction of the strap. It is the fixing of the contact element 76 to this carriage which ensures that the heating element 58 is always properly tensioned.

The preferred heating element 58 of Inconel is conveniently between 0.05 mm and 0.20 mm thick, with a width of at most about one half its unsupported length between the limb 52 of the U-support 50 and the tensioning element 68, the latter being slightly wider than the width of the strap which the heating element 58 is designed to seal. As compared with conventional heating elements for heat sealing, the element 58 thus possesses a very low thermal mass. The electrical leads to the elements 58 and 76 are omitted. Although a range of 0.05 mm to 0.20 mm has been suggested for the element thickness there are many situations where a thicker element would be preferable such as in a bench mounted machine where a thickness of e.g. 0.40 mm or more may be used.

While the heating element 58 supplied with heating current is moving between the strap layers 26, 28 more particularly by moving the supporting carriage with a forward and reverse motion parallel to the length of the strap, in a similar manner as previously described for FIGS. 1 and 2 the two strap layers are urged together under a fusing pressure. This fusing pressure is exerted by two resilient pads 30, 32 backed by respective rigid supports 34, 36. At least one support, the support 36 for instance and the resilient pad 30 carried thereby, is movable towards the other, as indicated by arrow 37, to enable the fusing pressure to be applied and relieved, as appropriate. Each pad 30, 32 is otherwise stationary, being wide enough to cover the full width of the strap and long enough to cover the entire stroke of reciprocation of the heating element, i.e. to cover the entire heated area of the two layers of strap.

The two layers of strap 26, 28 are thus urged together, with the moving heating element 58 sandwiched therebetween, with a substantially uniform pressure over the entire heated area. Foam rubber is a convenient material for the pads 30, 32.

Figure 5:
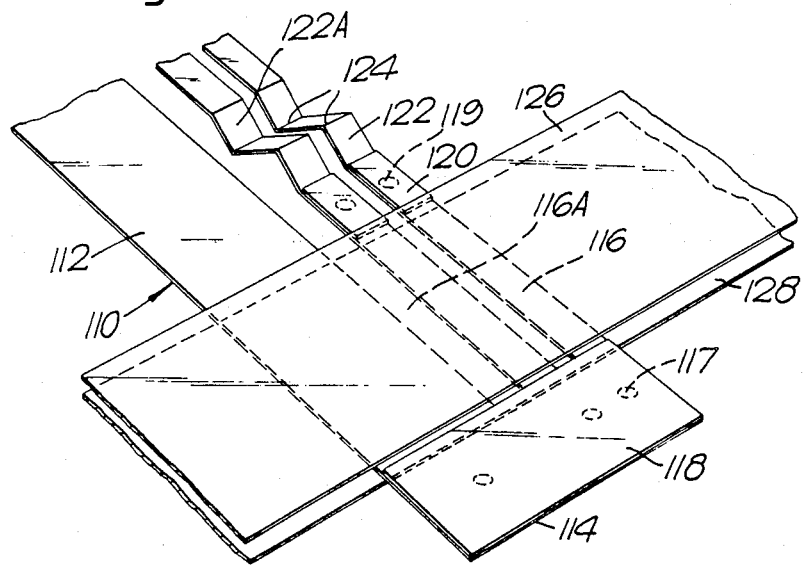

The heating element assembly of FIG. 5 comprises a somewhat resilient, flat, L-shaped support 110, conveniently of stainless steel, with a long leg 112 and short leg 114. One end of each of a pair of thin, flat, elongated heating elements 116, 116A, made of high resistivity, high temperature alloy such as Inconel, is spot welded, as indicated at 117, to the short leg 114 under a weld pad 118. The heating elements 116, 116A are disposed in parallel relationship. The other end of each heating element 116, 116A is spot welded, as indicated at 119, under a weld pad 120, to a corresponding tensioning element 122, 122A. The tensioning elements 122, 122A conveniently of stainless steel, are each resiliently formed by means of concertina-type folds 124 transverse to its length. The assembly thus forms a W-shape, with the heating elements 116, 116A tensioned parallel to the long leg 112 of the L-support 110.

The complete heating element assembly is mounted to a carriage (not shown) disposed to the side of two layers 126, 128 of thermoplastics strap to be heat sealed together, so that the W-shaped assembly, and in particular the heating elements 116, 116A (and corresponding part of the long leg 112 of the L-support) can be moved transverse to its length, between the two strap layers, in the longitudinal direction of the strap.

The preferred heating elements 116,116A of Inconel are each conveniently between 0.05 mm and 0.20 mm thick, with a width of at most one quarter its unsupported length between the L-support 110 and the corresponding tensioning element 122, 122A, the latter corresponding to the width of the strap which the heating element is designed to seal. As compared with conventional heating elements for heat sealing, the elements 116, 116A thus possess a very low thermal mass. In FIG. 5 the electrical leads to the elements 116, 116A are omitted. Although a range of 0.05 mm to 0.20 mm has been suggested for the element thickness there are many situations where a thicker element would be preferable such as in a bench mounted machine where a thickness of e.g. 0.40 mm or more may be used.

Moreover, as compared to the single heating element proposed earlier the two elements 116, 116A of the present invention can have reduced thickness, i.e. a thickness at the lower end of the previously specified range, for equivalent power, or can operate at higher voltage and lower current for the same power.

While the heating elements 116, 116A supplied with heating current are moving between the strap layers 126, 128 more particularly by moving the supporting carriage with a forward and reverse motion parallel to the length of the strap, in the same manner (as indicated in FIG. 2), the two strap layers are urged together under a fusing pressure.

The heating current for the heating elements 116, 116A is obtained from a source of secondary cells, e.g. rechargeable sealed nickel cadmium cells, supplied through a switch 142 operable by suitable means (not shown) to open and close in synchronism with the reversals of the forward and reverse motion of the heating element assembly. Thus the heating elements 116, 116A are supplied with current, at least 20 amps, (typically 40 A) from a voltage source, of typically 5 v only during the reverse stroke of the forward and reverse motion. During such reverse stroke, the speed of movement of the heating elements is carefully controlled, taking into account the materials involved, so that no part of the heating element assembly is heated as high as the decomposition temperature of the strap material. This is facilitated by use of thin flat heating elements of low thermal mass, the entire heating area of which is sandwiched between the two strap layers under the fusing pressure, so that heat is extracted from the heating element assembly at a rate which maintains the heated regions of the strap layers at a temperature only a little above the melting point of the thermoplastics material concerned.

Figure 6:
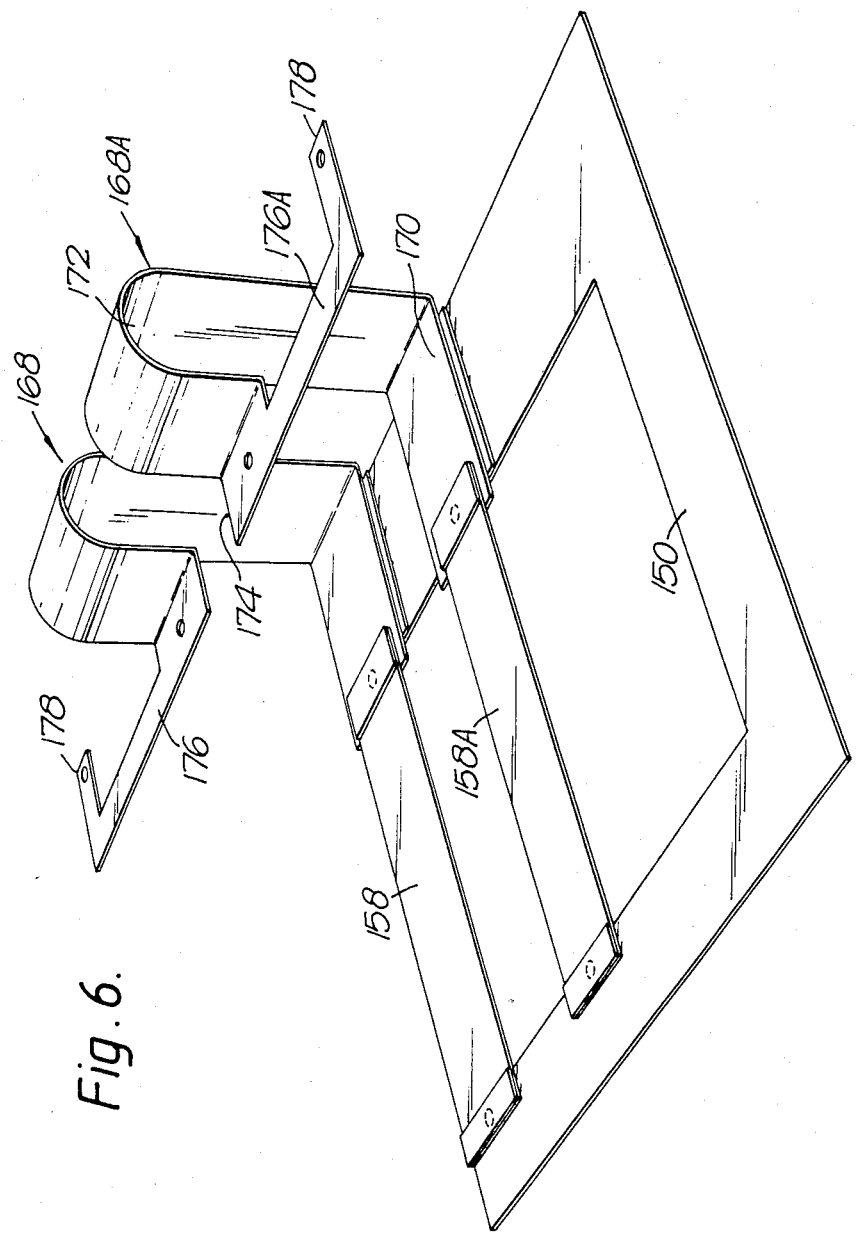

FIG. 6 shows a modified heating assembly incorporating a U-shaped tensioning element wherein the tensioning elements 122, 122A of FIG. 5 are replaced by springs 168, 168A of the construction illustrated, each having a foot 170, an intermediate U-portion 172 and an end portion 174 which is fixed to or integral with a laterally branched electrical contact 176, 176A. In use, current is supplied to the heating elements 58, 58A through these contacts 176, 176A respectively, the feet 170 of the springs 168, 168A being insulated from the support 150 which is movable by the carriage. The contacts 176, 176A are anchored at 178 in order to maintain tension in the heating elements 158, 158A, even when hot. The contacts 176, 176A conveniently project laterally to opposite sides in order to facilitate non-interfering electrical connections.

Figure 7:
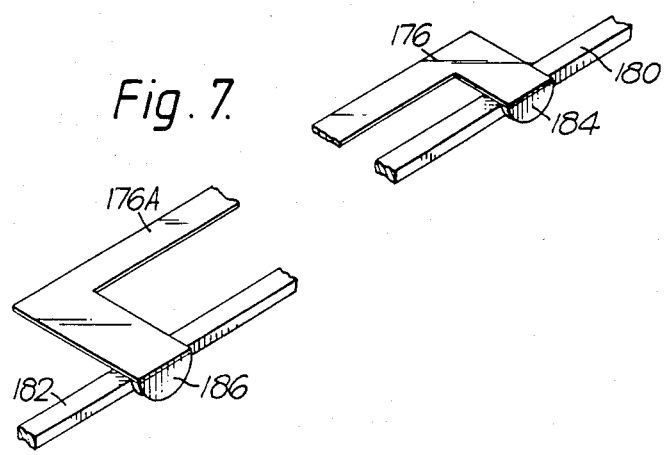

FIG. 7 shows a means of anchoring the connectors 176, 176A which at the same time provides the means by which electrical power is supplied to the heating elements.

In FIG. 7 two conductor rails 180, 182 are shown which are fixedly carried, parallel to the direction of reciprocation of the heatng assembly carriage, by the structure, e.g. tool body, relative to which the carriage is reciprocable. Each connector 176, 176A carries a contact 184,186, respectively, which engages behind the corresponding rail 180, 182, thus tensioning the springs 168, 168A (see earlier Figures). At the same time the contacts, which are preferably plated with a conductive metal such as silver, platinum, gold, copper or the like, makes electrical engagement with the conductor rails, with a contact pressure corresponding to the tension introduced into the springs. Power is supplied, as from a power circuit of FIG. 3, to the conductor rails 180, 182, whereby in use heating current is supplied to the heating elements 158, 158A through the contacts 184, 186 and connectors 176, 176A.

As previously described, current is only supplied during the reverse sense of reciprocation. The forward stroke provides a wiping movement of the contacts 184, 186 along the rails 180,182 which has a self-cleaning effect.

Although described particularly with reference to the heating element assembly of FIG. 6 the current supply means of FIG. 7 is also applicable to other heating element assemblies such as those shown in earlier Figures, simply by providing suitable connectors, equivalent to the connectors 176, 176A, on the one or more heating elements or tensioning elements. In this case, however, the connectors may or may not also serve as anchorages for the one or more tensioning elements.

Figure 8:
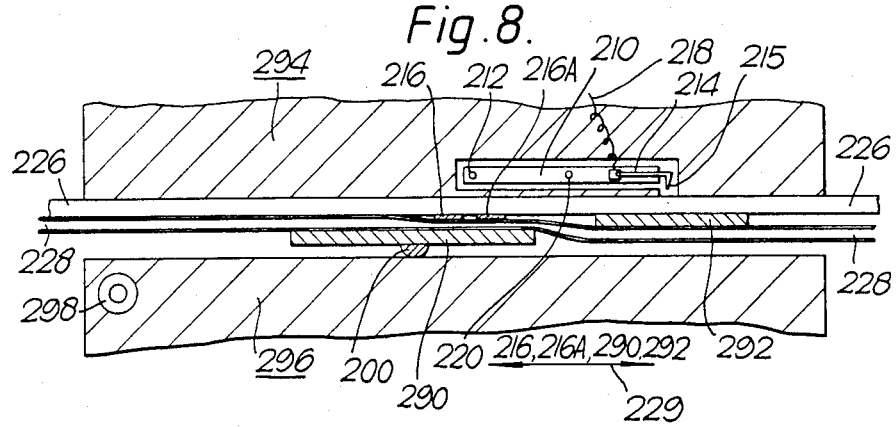

FIG. 8 shows diagrammatically the components of a heating and fusing assembly based on the device shown in FIG. 5 which is mounted for reciprocable movement. It includes, in addition to the heating element sub-assembly, conveniently referenced 216,216A, a stainless steel pressure pad 290 and a stainless steel separator plate 292. The heating and fusing assembly is reciprocable in a plane disposed between upper and lower platens 294, 296 as indicated by arrow 229. The upper platen 294 is fixed and the lower platen 296, which supports the spring steel pressure plate 290, is pivotable about pivot means 298 to enable the fusing pressure to be applied and to be relieved after heat sealing has been completed. The upper platen 296 can in itself be considered to constitute a fixed pressure pad. FIG. 8 is especially concerned with the configuration of the reciprocable assembly when the platens are closed.

First, heating current is supplied to the heating elements 216, 216A only in one sense of the forward and reverse motion, this being the reverse left to right stroke as shown in FIG. 8. The separator plate 292 thus acts to separate the two layers of thermoplastics strap 226, 228 before the opposed facing surface regions thereof are heated by the heating elements 216, 216A to effect melting without decomposition of the thermoplastics material. The pressure pad 290, overlaps the heating element sub-assembly 216, 216A, and has mounted on its underside a fulcrum 200 which allows the pad 290 to rock relative to the platen 296. In this way a differential force can be exerted by the pad 290 on the layer 228. The presence of the elements 216, 216A causes the pad 290 to rock in a clockwise manner so as to increase the squeezing pressure on the material trailing the heating elements as the sub-assembly of elements 216, 216A etc., moves to the right, so as to ensure sufficient pressure to cause bonding of the strap material.

As mentioned earlier the heating current for the heating elements 216, 216A connected in series is obtained (as shown in FIG. 3) from a source 40 of secondary cells, e.g. rechargeable sealed nickel-cadmium cells, supplied through a switch 42 operable by suitable means (not shown) to open and close in synchronism with the reversals of the forward and reverse motion of the heating element assembly. Thus the heating elements 216, 216A are supplied with current, at least 20 amps, (typically 40 A) from a voltage source, of typically 5 v only during the reverse stroke of the forward and reverse motion.

Figure 9:
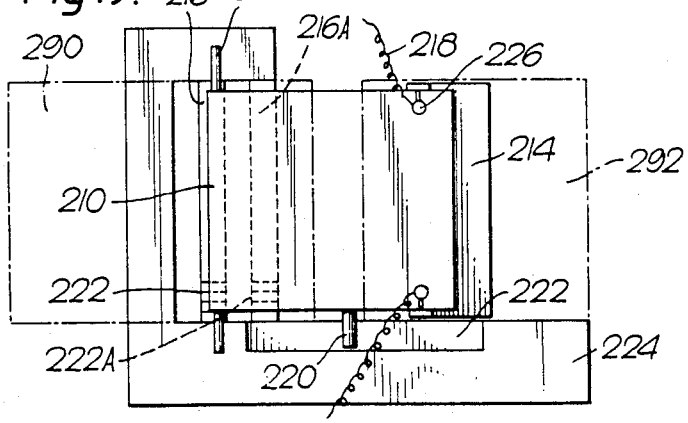

FIG. 8 also shows a cutter mechanism which is incorporated into the apparatus for severing one strap layer, i.e. that extending from a supply reel, without severing the other, after heat sealing has taken place. Detail of this cutting means is also shown in FIG. 9.

An insulating carrier board 210 is carried by a fixed pivot 212 above the line of the strap layers 226, 228 between which is movable the above-described heating and fusing assembly, which includes the heating elements 216, 216A and the separator plate 292. The board 210 carries a knife 214 having a severing edge 215 which extends across the full width of the strap. Flying leads 218 connect to opposite ends of the knife 214 so that severing can be effected, at the appropriate time, by a heated knife edge. This requires less mechanical effort than a mechanical guillotine, which is to be less preferred.

The board 210 is normally spring urged about the pivot 212 so that the knife edge 215 is biased upwardly away from the strap layers beneath it.

While heated, it is lowered to effect severing by means of an actuating finger 220 carried by the board 210 and which can engage a ramp surface 222 formed on the carriage 224 which effects reciprocation of the heating and fusing assembly.

In order that the heated knife edge 215 will sever only one layer (the upper layer 226) of the strap layers, its severing action is appropriately synchronised with the forward and reverse movement of the heating and fusing assembly. As previously mentioned, heating and fusing is effected during the reverse stroke of the reciprocation, left to right as shown in FIG. 8. The knife assembly is located so that, at the end of this reverse stroke after heating and fusing has been completed, the knife edge 215 is disposed at least approximately above either one of the heating elements 216, 216A or the separator plate 292. (See later description of sub-assembly cycle). This solid element, 216, 216A or 292, thus affords a backing for the knife between the two strap layers 226, 228.

It is important that the knife edge is perpendicular to the plane of the strap.

It is also to be noted that severing is effected after heating and fusing has been completed, i.e. after the heating current to the heating elements 216, 216A has been switched off. (See sub-assembly cycle description later). The knife 214 is preferably made of Inconel, which can readily be welded to contacts 226 of Berylium copper to which the flying leads 218 are connected. The knife 214 is preferably intermittently heated, by means of a suitable switch synchronised to the reciprocating motion of the carriage.

Heating element sub-assembly cycle

1. Sub-assembly moves forward (from a home position) to a maximum displaced position.

2. Slightly before reaching this maximum position, the electric current is turned on and the element or elements begin to warm up to the fusing temperature.

3. During the return movement (towards the home position) the high temperature of the element or elements causes the two layers of material to fuse behind it.

4. Just before the sub-assembly reaches the home position the current is switched off thus allowing the element or elements to begin to cool down so inhibiting fusing of the two layers over the final phase of the displacement.

5. The sub-assembly pauses at the home position for a length of time sufficient to clear the bond caused by the fusing to become secure.

6. The sub-assembly is then moved in the forward direction once again, while the current remains OFF, until it occupies an intermediate position in which the element or one of the elements in the separator plate 92 lies under the heated knife edge 215. (Preferably the leading element is located below the edge 116 so as to reduce the length of the tab of unfused material which will be left after securing).

7. The electrical current of the knife edge 116 is initiated as soon as the sub-assembly starts to move towards its intermediate position and after severance the current for the knife edge is turned-off.

8. After severance the sub-assembly moves in the return direction once again to return to its home position, from where the cycle can begin again.

The above described apparatus may be used in a packaging method which comprises the following successive steps: (1) position carton; (2) loop strap around carton; (3) load strap into securing tool; (4) take up slack; (5) tension strap; (6) heating seal/cut-off strap; (7) release. If the device is incorporated into a hand tool, the tool is removed. If it is incorporated in the operating head of a stationary stripping machine, the pack is removed from the machine. Thus, in practice, the illustrated apparatus may be combined with a strap tensioner and strap cutter.

The present invention is applicable to all types of thermoplastics strap, substantially regardless of width, colour or thickness, especially straps up to 30 mm width and 1.5 mm thickness.

Clearly, various modifications are possible within the scope of the invention. For example, the heating element assembly may utilise various metallic materials other than those specified. In particular, the heating element may be made of an austenitic stainless steel or a Brightray alloy. In some circumstances the resilient pads applying the fusing pressure may be replaced by spring-urged, relatively rigid pads. However, for the fusing of straps with crowned or barrel-shaped surfaces across their width, the use of resilient pads will be desirable to ensure close contact between such strap surfaces. The heating element may be maintained under tension in various ways other than a tensioning element having concertina-type folds. In general, various different and modified arrangements are possible in accordance with the invention, the scope of which is defined by the appended claims.

I claim:

1. Apparatus for heat sealing together layers of strap of thermoplastics material, comprising:
   a heating and fusing sub-assembly whereat regions of the layers of strap are brought into adjacent relationship, including means for heating said regions of their opposed facing surfaces to effect melting thereof, and
   means including at least one resilient pad for pressing the melted surface regions together to effect fusing of the strap layers, said resilient pad forming part of the heating and fusing sub-assembly so as to move in unison with and in the same direction as the heating means,
   said heating and fusing sub-assembly including at least one solid backing element which extends between the two strap layers, and
   cutting means for severing one strap layer and not the other after fusing the strap layers together, said cutting means including a knife edge which is operable on one of said layers against the backing afforded by said solid backing element.

2. Apparatus according to claim 1 wherein said solid backing element is a heating element.

3. Apparatus according to claim 1 wherein said solid backing element is a separator plate which separates the two strap layers immediately prior to heating.

4. Apparatus according to claim 1 wherein the heating and fusing means is movable along the length of he strap layers in order to fuse together a predetermined strip therealong.

5. Apparatus according to claim 4 wherein the operation of the knife edge is synchronised movement of said heating and fusing means.

6. Apparatus according to claim 4 wherein the heating and fusing means is reciprocable by a carriage movable relative to a fixed structure, and heating and fusing is effected on the reverse stroke of said carriage, and wherein the cutting means is stationary and the knife edge is operable after completion of heating and fusing by a cam means having a part carried by or acting on the cutting means.

7. Apparatus according to claim 6 wherein the knife edge is pivotable about a fixed axis, and is pivotally operable by means of an operating element carried by the fixed structure and engaging a ramp surface on the carriage.

8. Apparatus according to claim 1 wherein the knife edge forms part of a heated knife.

9. Apparatus for heat sealing together layers of strap of thermoplastics material, comprising at least one thin flat electrical heating element, means for supporting said heating element under tension between said layers of strap, means including at least one resilient pressure pad for pressing said layers of strap together with a fusing pressure, said heating element, said support means and said at least one resilient pressure pad comprising a heating and fusing assembly which is movable relative to the layers of strap, and means for moving said heating and fusing assembly in unison so that in use the heating and fusing assembly with said heating element between two layers of strap moves generally in the same longitudinal direction thereof.

10. Apparatus according to claim 9 wherein said heating element has low thermal mass and is supplied with heating current from a secondary cell source.

11. Apparatus according to claim 9 wherein said pressure pad is provided for pressing the strap layers together under a fusing pressure in the heated regions of the said layers, said pad being mounted for rocking about an axis perpendicular to the length direction of the strap layer and being resiliently deformable so as to be capable of bowing about the rocking axis to accommodate the movement of the heating element between the two layers of flexible material.

12. Apparatus according to claim 11 wherein a separator plate is provided between the two layers of flexible material to separate the layers of strap prior to heating.

13. Apparatus according to claim 12 wherein the layers of strap are sandwiched between a first pressure pad which is constituted by a fixed first platen and the rockable resilient pressure pad is supported by a second platen the latter being movable as by pivoting away from the first platen to enable the fixing pressure to be applied and to be relieved.

14. Apparatus according to claim 9 wherein the heating element is tensioned by stretching between a support and a tensioning element.

15. Apparatus according to claim 14 wherein the tensioning element is an elongate element extending in line with the heating element and resiliently formed by concertina-type folds transverse to its length.

16. Apparatus according to claim 14 wherein the tensioning element is a spring having a foot connected to the heating element, an intermediate U-portion the limbs of which can flex toward and away from one another in line with or parallel to the length of the heating element, and an end portion whereat the spring is anchored to effect tensioning of the heating element.

17. Apparatus according to claim 14 wherein the heating element is a flat element between 0.075 mm and 0.125 mm thick with a width about one half its unsupported length between the support and the tensioning element.

18. Apparatus according to claim 14 wherein the heating element comprises two or more thin flat elongate electrical heating elements and means supporting said two or more heating elements under tension in generally parallel relationship.

19. Apparatus according to claim 9 wherein the electrical heating element is reciprocable in use, and wherein a pair of substantially rigid electrical connectors carry contacts making sliding electrical engagement with a corresponding pair of electrical rails carried by a structure relative to which the heating element is reciprocable, the rails extending parallel to the direction of reciprocation and being adapted for supply of electrical power thereto in order to transmit heating current to and from the at least heating element through said connectors and contacts.

20. Apparatus according to claim 9 further comprising cutting means for severing one strap layer and not the other after fusing the strap layers together.

21. Apparatus according to claim 20 wherein said cutting means includes a knife edge which is operable on one of said layers against the backing afforded by a solid backing element.

22. Apparatus according to claim 21 wherein the knife edge forms part of a heated knife to reduce the mechanical effort needed for cutting.

23. Apparatus according to claim 22 where the solid backing element is a heating element or is a separator plate.

24. Apparatus according to claim 9 wherein the moving means comprises means for moving the heating element with a forward and reverse motion substantially in the longitudinal direction of the layers of strap.

25. Apparatus according to claim 24, comprising;
switching means for supplying heating current to the heating element only during one sense of the forward and reverse motion, wherein the fusing pressure is applied only during said one sense of the motion.

26. A heating and fusing assembly for use in a heating sealing apparatus for thermoplastics materials comprising a support, at least two thin flat elongated electrical heating elements stretched between connecting means mounted on the support such that the elements can be introduced between, and be in contact with, two layers of thermoplastic material, at least one connecting means for each such heating element comprising a tensioning element for maintaining the corresponding heating element under tension even when hot, and means including at least one resilient pressure pad for pressing said thermoplastics materials together with a fusing pressure after heating by means of said heating elements, said assembly adapted to be moved in unison in a predetermined direction.

* * * * *